Oct. 25, 1955 N. E. HABART 2,721,386
PRUNING NIPPERS WITH LOCK DEVICE
Original Filed Sept. 18, 1947
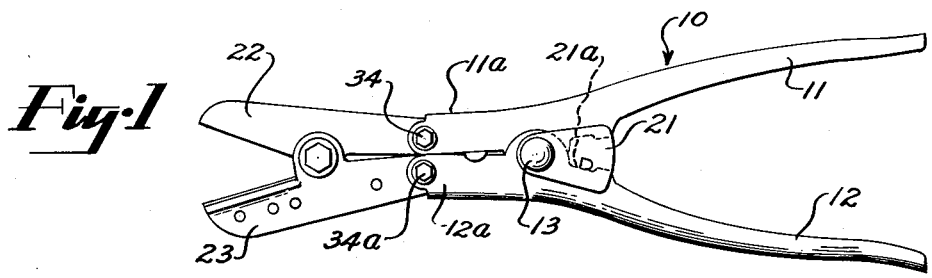
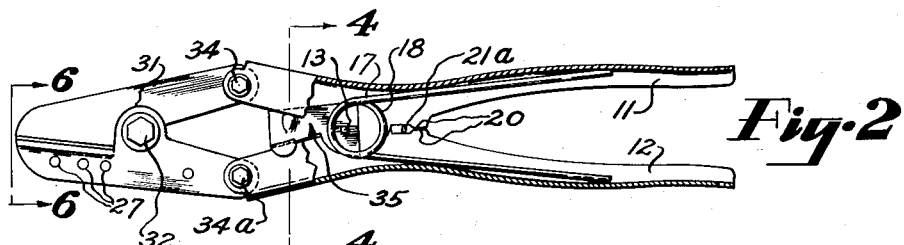
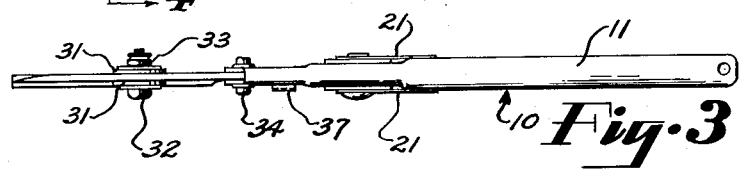
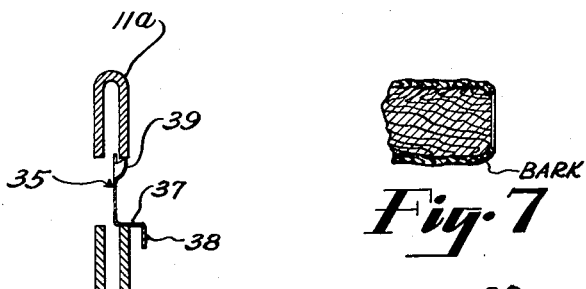
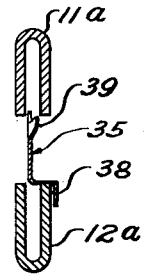
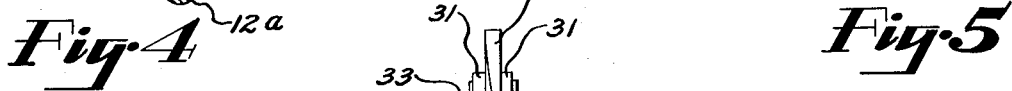
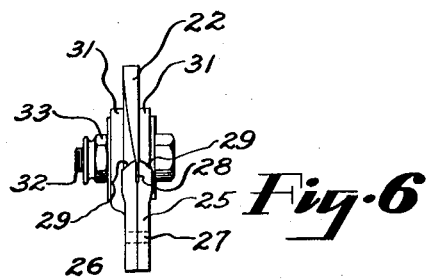
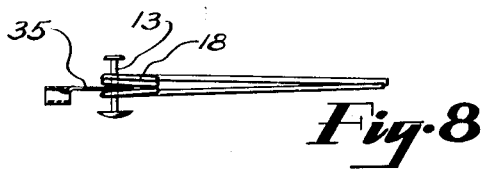
INVENTOR.
NORMAN E. HABART
BY Fay, Golrick & Fay
ATTORNEYS

United States Patent Office 2,721,386
Patented Oct. 25, 1955

2,721,386

PRUNING NIPPERS WITH LOCK DEVICE

Norman E. Habart, Bedford, Ohio

Original application September 18, 1947, Serial No. 774,848. Divided and this application March 2, 1953, Serial No. 340,570

7 Claims. (Cl. 30—262)

The present invention relates to nipper devices, such as pruning snips, and similar hand tools. This application is a division of my co-pending application Serial No. 774,848, filed September 18, 1947, now abandoned.

One object of the invention is to provide pruning nippers which are constructed so that the bark of the plant member at the point of cutting will not be mutilated or torn but will be turned against the inner structure of the plant member to promote rapid healing.

Other objects and advantages of the invention will be apparent from the following description of a preferred form of the invention, reference being made to the accompanying drawings wherein:

Fig. 1 is a side view in elevation of a pair of pruning nippers;

Fig. 2 is a side view of the pruning shears showing the position of the various parts thereof in the blade-closing position and with certain parts of the nippers broken away.

Fig. 3 is a top view in elevation of the nippers;

Fig. 4 is a view in section taken on line 4—4 of Fig. 2 showing the position of the lock for the nippers when the blades are locked closely;

Fig. 5 is a view similar to that of Fig. 4 but showing the lock in the releasing position;

Fig. 6 is an end view of the nipper taken on line 6—6 of Fig. 2;

Fig. 7 is a fragmentary view in section showing a twig cut by the nipper; and

Fig. 8 is a fragmentary, top view of a spring and lock plate.

Referring now to the drawings, I have shown a pair of pruning nippers indicated generally at 10. These nippers consist of two handle members 11 and 12 pivoted together by a pin 13, which may be in the form of a rivet, adjacent one end to provide blade operating lever portions 11a and 12a, respectively. The handle members are each formed of a channel shaped steel member, which provides a comfortable hand gripping surface and a rigid operating lever. The open sides of the channels of the handle members face one another, and a wire spring 17 is arranged to spread the handle portions of the members 11 and 12. Preferably, the spring 17 consists of a resilient wire having three convolutions in the central portion as shown at 18, with straight end portions extending in the channels of the respective handle members. The pin 13 extends axially through the convolutions. Thus, the handle members are normally urged into the position shown in Fig. 1.

Preferably, the handle members are provided with abutments 20 which limit the degree to which the handles may be brought together, as shown in Fig. 2. In order to prevent the skin of the hand from being pinched between the abutments 20, I have provided a pair of fan shaped guard plates 21 on each side of the handle members, the plates being mounted in place by the pin 13 extending therethrough. A positioning lug 21a extends inwardly from each plate and cooperates with the edges of the handle members to retain the plates in effective guarding position. Thus, the outer edges of plates 21 prevent the operator from inadvertently injuring his hands by pinching the skin thereof between the handle members.

The ends of lever portions 11a and 12a of the handle member are operatively attached to two blades 22 and 23, which are pivoted together, the blade 22 being the cutting blade and the blade 23 the anvil blade. The blade 23 is made up of two complementary formed plates 25 and 26 which are riveted together by rivets 27. The upper confronting edges of the two plates are bowed to form a groove 28 for receiving the cutting edge of the blade 22. The upper outer edges of the plates 25 and 26 are beveled as at 29, the purpose of which will be explained hereinafter. Lugs 31 are formed on plates 25 and 26 and the lugs each have an opening therethrough for receiving a bolt 32 for pivotally attaching the cutting blade 22 to the anvil blade. A nut 33 is threaded on the bolt 32 to hold the blade on the bolt. The cutting blade 22 is preferably formed of a single piece of steel tapered to its lower edge, which is the cutting edge. The blades 22 and 23 are attached to the lever portions 11a and 12a of the members 11 and 12 by pivot bolts 34 and 34a, respectively, so that the blades are operated by the handle members. As may be seen in Figs. 1 and 2, when the handle members 11 and 12 are separated the blade members will be separated and when the handle members are brought together the cutting blade is brought into the groove 28 of the anvil blade. The leverage of the handle members on the blades are such as to provide for substantial multiplication of the force operating the handle levers so that when the nippers are used to cut a twig, for example, the beveled portions 29 of the anvil blade 23 will roll the bark of the twig inwardly against the severed portion of the twig. This is illustrated in Fig. 7 and it will be seen that the severed part is protected adjacent to the bark, thereby promoting more rapid healing of the twig than where the bark is shredded or torn as in the case with the usual pruning shears.

It is desirable to lock the handles 11 and 12 in the blade closing position shown in Fig. 2, and for this purpose I have provided a locking device indicated generally at 35. This locking device consists of a plate which is positioned within the recesses of the channel-shaped lever portions 11a and 12a of the handle members 11 and 12, and the plate is held in place by the pivot pin 13 which extends through an opening through the plate. Also, the locking plate is positioned between two of the convolutions of the coiled wire spring 17 so that the coils of the wire tend to maintain the member 35 urged to the right looking toward the front end of the tool and against the right hand side, looking in said direction, of the channeled lever portion 12a as viewed in Fig. 4. The lower part of the locking plate is turned outwardly as at 37 for engaging the upper right hand side edge of the lever portion 12a of the handle member 12. Preferably, the outturned portion 37 has a downwardly extending tab 38 which serves as a presser button by which the locking device 35 may be urged inwardly against the pressure of the spring. An outwardly projecting lug 39 is formed in the upper portion of the locking plate and this lug is adapted to extend into alignment with the lower edge of the channel lever portion 11a when the plate is urged by spring 17 toward the right hand wall of the lever portion and to be withdrawn from such alignment when the plate is pressed inwardly by the operator. It will be seen in Fig. 4 that the part 37 and lug 39 cooperate to maintain the lever portions 11a and 12a blocked in the separated position when the handles 11 and 12 are brought toward one another and locking device 35 is positioned with lug 39 under the right hand edge of lever portion 11a. To release the handle members, locking device 35 is merely moved by the operator laterally inwardly of the lever portions 11a and 12a to the position shown in Fig. 5. The frictional engagement of the lug 39 with the inside of lever portion 11a retains the locking plate in the upper portion of lever 11a and out of the locking position after having been pivoted to such position by the operator to condition the tool for use. By forming the tab 38 parallel with the side of the lower lever it is at all times accessible for operation of the lock but it cannot interfere with the operation of the nippers. It will be apparent that this locking arrangement is inexpensively formed and it is positive in operation as well as being out of the way during normal operations.

Although I have described but one form of the invention, it is to be understood that other forms might be adopted, all falling within the scope of the claims which follow.

I claim:

1. In a nipper device, a pair of levers pivoted together for actuating the blades of the device, spring means tending to actuate the levers in opposite directions about their pivot; and a lock for locking the levers against said spring action, said lock comprising a member adjacent to said levers and mounted for movement laterally with respect to said levers, and pivotally movable substantially in the plane of movement of the levers, said member having two spaced abutments engageable with the levers, respectively, when said member is in a certain one of its lateral positions for maintaining the levers locked, one of said abutments being movable out of engagement with its cooperating lever when the member is moved laterally from said one position, and means for yieldingly maintaining said member in said one position.

2. In a nipper device, a pair of levers pivoted together for actuating the blades of the device, spring means tending to actuate the levers in opposite directions about their pivot; and a lock for locking the levers against said spring action, said lock comprising a member adjacent to said levers and mounted for movement laterally with respect to said levers, and pivotally movable substantially in the plane of movement of the levers, said member having two spaced abutments engageable with the levers, respectively, when said member is in a predetermined position in said plane and in a certain one of its lateral positions, one of said abutments being movable out of engagement with its cooperating lever when said member is moved out of said one lateral position and to a second position in said plane, and means urging said member in a lateral direction for yieldingly maintaining the member in said one lateral position.

3. In a nipper device, a pair of operating levers; a pivot for the levers, said levers each having an edge movable toward and away from the other lever when the levers are oscillated in their pivot; a plate adjacent to the levers and adjacent to said edges thereof, said plate being movable in a plane parallel to the plane of movement of the levers and laterally with respect to the levers, said plate having a projection engageable with the said edge of one of the levers and a second projection engageable with the said edge of the other of said levers when the plate is moved laterally toward the levers, and disengageable with the said edge when the plate is moved laterally from the levers; and spring means for urging the plate laterally against the levers.

4. A device of the character defined in claim 3 in which the first mentioned projection of the plate includes an actuating element for manipulating said plate.

5. In a nipper device, a pair of blade actuating levers pivotally connected by a pivot pin; a lock member pivoted to the pin and having a part extending parallel with the levers, said part having two spaced, laterally projecting lugs engageable with edges of said levers for locking of the levers in jaw-closed position; and a spring for separating the levers on one side of the pivot pin and for resiliently urging said member laterally toward said edges of the levers.

6. In a nipper device, a pair of levers pivoted together for actuating cutting blades, said levers including channel shaped portions arranged with the open sides of the channels confronting one another, a lock member mounted between the levers and within one of said channels, said member being movable laterally with respect to the channels and into and out of said channel and having two spaced, laterally projecting lugs engageable with opposed edges of the two levers to cooperate with said edges respectively, for maintaining the levers separated, one of said lugs being moved out of alignment with its cooperating edge when the lock member is moved laterally inwardly; and resilient means for urging the member laterally for positioning said abutments in alignment with the levers.

7. A device of the character defined in claim 6 in which the other of said abutments on the locking member includes an actuating part extending parallel to the side of one of the channel shaped lever portions and a plane outside the channel portion.

References Cited in the file of this patent

UNITED STATES PATENTS

| 1,543,899 | Bernard | June 30, 1925 |
| 2,306,506 | Simonsen et al. | Dec. 29, 1942 |
| 2,504,766 | Vosbikian | Apr. 18, 1950 |